United States Patent [19]

Koizumi

[11] 3,836,881

[45] Sept. 17, 1974

[54] DOUBLE-TUNED CIRCUIT DEVICE WITH ADJUSTABLE COUPLING COEFFICIENT MEANS

[75] Inventor: Yasumi Koizumi, Tokyo, Japan

[73] Assignee: Alps Electric Co., Ltd., Tokyo, Japan

[22] Filed: Sept. 26, 1973

[21] Appl. No.: 401,053

[30] Foreign Application Priority Data

Nov. 14, 1972 Japan............................ 47-113985

[52] U.S. Cl................... 336/87, 333/73 R, 334/74, 336/131

[51] Int. Cl........................................... H01f 21/10

[58] Field of Search....... 336/131, 84, 130, 87, 136, 336/75; 333/70 S, 73 R, 82 R, 82 B; 334/66, 70, 74, 75

[56] References Cited

UNITED STATES PATENTS

| | | | |
|---|---|---|---|
| 1,651,658 | 12/1927 | Young | 336/87 X |
| 2,082,590 | 6/1937 | Neighbors et al. | 336/87 X |
| 2,872,649 | 2/1959 | Boothe | 336/75 X |
| 3,058,076 | 10/1962 | Hasler et al. | 336/87 X |
| 3,471,844 | 10/1969 | Schugt | 336/87 X |

FOREIGN PATENTS OR APPLICATIONS

| | | | |
|---|---|---|---|
| 654,126 | 6/1951 | Great Britain | 336/75 |
| 691,333 | 5/1953 | Great Britain | 333/70 S |

*Primary Examiner*—Thomas J. Kozma

[57] ABSTRACT

A double-tuned circuit device includes a housing, a pair of helical resonator units mounted in the housing and means for adjusting the electromagnetic coupling coefficient between the resonator units. The adjusting means is interposed between the units and comprises a movable electromagnetic shielding member electrically connected to the housing and means for mounting the member within the housing such that the position of the member relative to the resonator units may be varied. In the first embodiment the shielding member is connected to the mounting means by a bendable neck portion. In the second embodiment the shielding member is formed in slidable engagement with the mounting means. In the third embodiment the shielding member is frictionally held to the sides of the housing by the mounting means.

10 Claims, 9 Drawing Figures

DOUBLE-TUNED CIRCUIT DEVICE WITH ADJUSTABLE COUPLING COEFFICIENT MEANS

The present invention relates to double-tuned circuit devices of the type having a pair of spaced helical resonator units and more particularly to a novel means for adjusting the electormagnetic coupling coefficient between the resonator units.

Double-tuned circuit devices consisting of a pair of helical resonator units mounted in a common housing are extensively used in the electronics industry as band-pass filters, particularly in the UHF and VHF frequency ranges. The electrical characteristics of these devices depend not only on the resonant frequency of each of the units but also upon the electromagnetic cross-coupling between the units. The magnitude of the cross-coupling between the resonator units, termed the electromagnetic coupling coefficient, can be varied to change the electrical properties of the device to adopt the device for a specific application.

The electromagnetic coupling coefficient can be varied in a number of ways, the most obvious of which is to move the helical resonator units closer together or farther apart. However, this method is impractical because it may be mechanically difficult or physically impossible to implement. Changing the distance between the resonator units may be mechanically difficult because of the preciseness with which it must be performed. Further, the units may be inaccessible, once situated within the housing, without dismantling the entire device. Moreover, detaching one of the units from the housing and then reattaching it at a different location is a costly operation requiring a great deal of time and labor. This method may be physically impossible without altering the dimensions of the housing because the size of the housing may not permit the resonator units to be moved far enough apart to provide the required amount of electromagnetic coupling if only a small coupling coefficient is desired.

In order to overcome this difficulty, conventional double-tuned circuit devices are provided with apparatus for setting the electromagnetic coupling coefficient between the resonator units. Commonly, the setting apparatus is a shielding plate formed with a coupling window and fixed to the housing at a point between the helical resonator units. The geometry of the shielding plate determines the electromagnetic coupling coefficient between the units. However, this prior art configuration does not provide any ready means of adjusting the coupling coefficient between the resonator coils without physically changing the geometry of the shielding plate. Adjustment of the coupling coefficient is indispensable because it is almost impossible to mount the resonator units in the housing in a precisely enough manner to insure that the device has the desired electrical characteristics.

It is, therefore, the prime object of the present invention to provide a double-tuned circuit device with means for easily and inexpensively adjusting the electromagnetic coupling coefficient between the resonator units.

It is another object of the present invention to provide a double-tuned circuit device wherein the resonator units need not be precisely located within the housing for the device to demonstrate the desired electrical characteristics.

In accordance with the present invention, a double-tuned circuit device is provided having a metal housing, a pair of helical resonator units mounted in the housing and means for adjusting the electromagnetic coupling coefficient between the resonator units. The adjusting means is interposed between the resonator units and comprises a movable electromagnetic shielding member electrically connected to the housing and means for mounting the member within the housing such that the position of the member relative to the resonator units may be varied.

In the first embodiment the shielding member is connected to the mounting means by a bendable neck portion so that the position of the member may be varied by bending the neck portion. In the second embodiment the shielding member is slidably attached to the mounting means such that the position of the shielding member may be varied by sliding the shielding member with respect to the resonator units. In the third embodiment the mounting means frictionally holds the shielding member such that it may be moved in a plane parallel to the cores of the resonator coils.

To the accomplishment of the above, and to such other objects as may hereinafter appear, the present invention relates to a double-tuned circuit device having means for adjusting the electromagnetic coupling coefficient between the resonator units therein as defined in the appended claims and as described in the specification, taken together with the accompanying drawings wherein the like numerals refer to like parts and in which:

Figure 4:
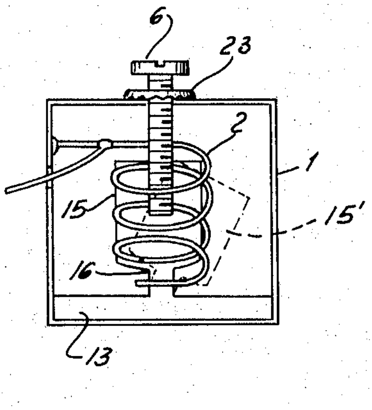
FIG. 4 is a front elevational view of the device shown in FIG. 3.
Figure 5A:
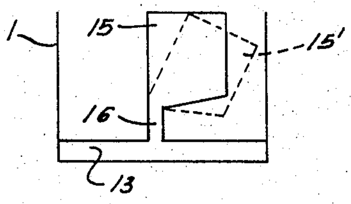
Figure 5B:
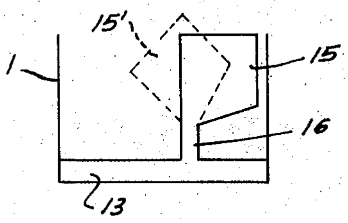
Figure 6A:
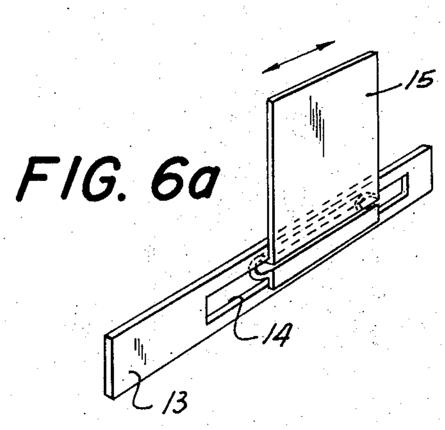
Figure 6B:
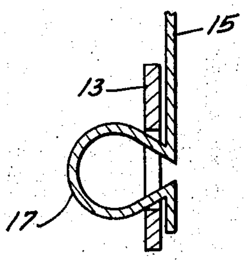
Figure 7:
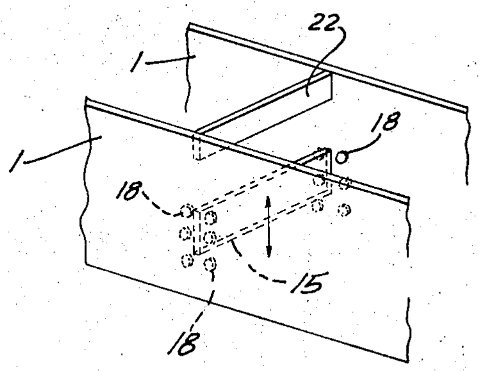

FIG. 5*a* and 5*b* are views similar to that of FIG. 4 showing different position of the shielding member for adjusting the coupling coefficient of the device;

FIGS. 6*a* and 6*b* show perspective and cross-sectional views, respectively of the adjusting means of the second embodiment of the present invention; and FIG. 7 shows a perspective view of the coefficient adjusting means of the third embodiment of the present invention.

Figure 1:
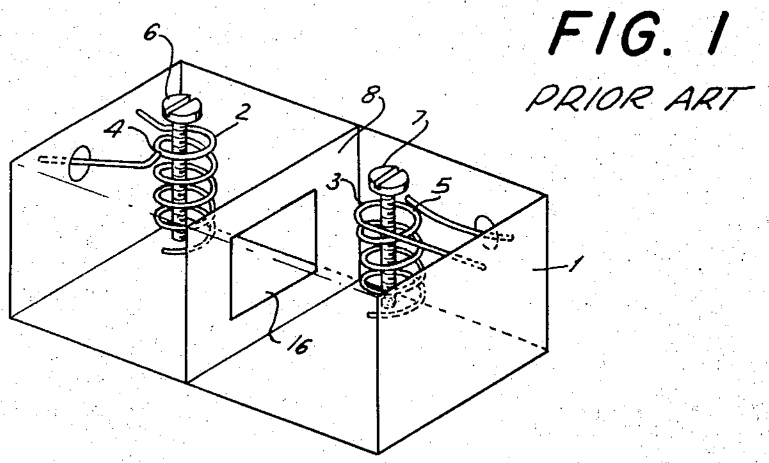
FIG. 1 PRIOR ART
FIG. 1 is a schematic perspective view of a typical double-tuned circuit device of the prior art.

FIG. 1 is a schematic representation of a double-tuned circuit device of the prior art which is widely employed as a filter in the VHF and UHF frequency ranges. The device consists of a housing 1 of generally rectangular shape and is shown with the top wall thereof removed. Within the housing are situated an input side helical resonator coil 2 and an output side helical resonator coil 3. Interposed between coils 2 and 3 is a shielding plate 8 fixedly mounted to opposing sides of housing 1. Shielding plate 8 has a coupling window 16 in the form of a rectangular aperture situated in the center thereof.

Screws 6 and 7, disposed in the cores of coils 2 and 3 respectively, are supported by housing 1. Adjustment of the resonant frequency of each of the helical resonator coils is achieved by controlling the degree of insertion of the adjusting screws 6 and 7 within the respective coils. Normally this is accomplished by nuts 23 (FIG. 4) situated on the top wall of housing 1 into which screws 6 and 7 respectively are received. The rotation of the scews will then cause axial movement thereof within the cores of the coils to vary the degree of insertion therein. 43

The electromagnetic coupling coefficient is determined by the geometry of shielding plate 8 and specifically the size and shape of coupling window 16. Furthermore, by selecting appropriate points on the coils where input side impedance adjusting tap 4 and output side impedance adjusting tap 5 are provided, input and output side impedances of the double-tuned circuit device can be set to desired values.

Figure 2:
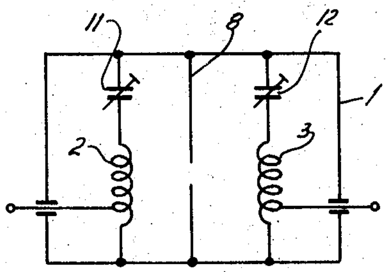
FIG. 2 is an equivalent circuit diagram of a double-tuned circuit device.
Figure 3:
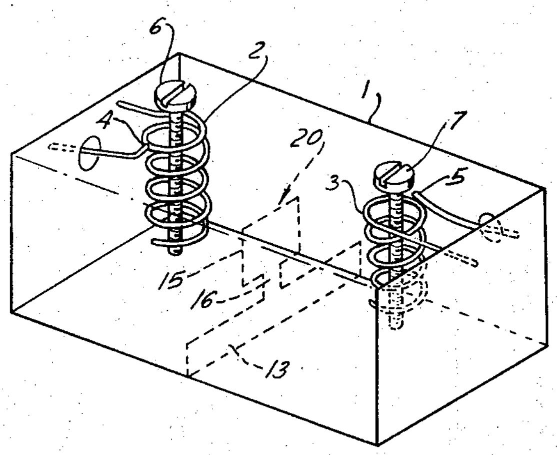
FIG. 3 is a schematic perspective view of the first embodiment of the present invention.

FIG. 2 shows a schematic diagram of the equivalent circuit of the double-tuned circuit device. As can be seen in this figure, varible capacitances 11 and 12 are the electrostatic capacitances whose values depend upon the degree of insertion of adjusting screws 6 and 7, respectively relative to the corresponding coils. As the degree of insertion of the adjusting screws in varied, so is the electrostatic capacitance associated with that coil. In this way, the resonant frequency of the resonator unit can be adjusted.

With the configuration of the prior art, adjustment of the coupling coefficient is impossible without either changing the geometry of shielding plate 8 or varying the position of the resonator units relative to each other by dismantling the device. Since it is impractical to change the geometry of plate 8 and virtually impossible to mount the resonator units within the housing accurately enough to give the device the precise electrical properties desired, the devices of the prior art often had electrical characteristics which were not accurately matched to the function they were designed to perform. The present invention eliminates this drawback by providing a means for adjusting the electromagnetic coupling coefficient between the resonator units while also eliminating the necessity for precisely placing the units relative to each other.

The first embodiment of the present invention is shown in FIGS. 3, 4, 5*a* and 5*b*. The double-tuned circuit device of the present invention consists of a rectangular shaped housing 1 having helical resonator coils 2 and 3 mounted therein. In order to overcome the disadvantages of prior art devices, the present invention includes a means for adjusting the electromagnetic coupling coefficient between the resonator coils 2 and 3. This means is generally designated as 20. Adjustment means 20 in this embodiment comprises a base portion 13 which has a first and a second end, each of which is fixedly mounted to a different opposing wall of housing 1. A movable electromagnetic shielding member in the form of plate 15 is connected to base 13 by a neck portion 16. Neck portion 16 is made of a bendable material such that plate 15 can be moved from its initial position to other positions, as shown in FIGS. 4, 5*a* and 5*b* in phantom and designated 15', to vary the coupling coefficient between the resonator coils. It is also possible to form adjusting means 20 with the neck portion 16 offset from a line drawn between the resonator coils, as shown in FIG. 5*b*. The shape, size and position of shielding plate 15 and neck portion 16 will depend upon the desired electrical characteristics of the device.

The second embodiment of the present invention is shown in FIGS. 6*a* and 6*b*. As can be seen in these figures, the base portion 13 of the means for adjusting electromagnetic coupling coefficient 20 is connected to housing 1 in the manner described previously. Base portion 13 is provided and an elongated slot 14 is formed therein. Shielding plate 15 is provided with a means for slidably mounting the plate to base portion 13 such that plate 15 can slide in a direction transverse to a line drawn between the resonator units. The slidable mounting means is most conveniently and inexpensively formed by providing a horseshoe shaped protrusion 17 along the width of shielding plate 15, preferably toward the lower end thereof. This protrusion 17 is then inserted within slot 14 to provide slidable engagement with base 13. Similar results could be obtained with other types of conventional sliding engagement structures.

FIG. 7 shows the third embodiment of the present invention. In this embodiment the mounting means comprises two pairs of parallel rows of bosses 18. Each pair is situated on a different one of the opposing sides of housing 1. The pair of rows on one side of the housing are aligned in an opposing relationship with the pair of rows on the opposite side, and each row is spaced from the row adjacent to it by a distance substantially equal to the width of shielding member 15. Each pair of rows of bosses 18 is effective to frictionally support one side of the shielding member. In this way, shielding plate 15 can be moved in a vertical plane to adjust the electromagnetic coupling coefficient between the resonator units. A second shielding plate 22 fixedly mounted to housing 1 parallel to plate 15 may also be utilized if desired.

Through the use of the present invention, the double-tuned circuit device can be precisely and accurately conditioned to have the desired electrical characteristics after the resonator units have been mounted on the housing. This eliminates the necessity for precisely mounting the resonator units relative to each other thereby reducing manufacturing costs and enhancing the functional capabilities of the device.

Three preferred embodiments of the present invention have been specifically disclosed herein for purposes of illustration. It is apparent that many variations and modifications may be made upon the specific structures disclosed herein. It is intended to cover all of these variations and modifications which fall within the scope of this invention as defined by the appended claims.

I claim:

1. A double-tuned circuit device comprising a housing, a pair of resonator units, each including an inductor, mounted in said housing and a planar electromagnetic shielding member electrically connected to said housing and situated between said units in a plane substantially perpendicular to a line drawn between said units and means for mounting said member to said housing, said mounting means permitting movement of said member in said plane thereby to adjust the electromagnetic coupling coefficient between said units.

2. The device of claim 1 wherein said mounted means has a first and a second end and wherein said housing has a pair of opposing sides, each of said ends being mechanically connected to a different one of said sides.

3. The device of claim 1 wherein said shielding member comprises a plate operably connected to said mounting means by a bendable neck portion.

4. The device of claim 2 wherein said shielding member comprises a plate operably connected to said mounting means by a bendable neck portion.

5. The device of claim 1 wherein said mounting means comprises a guide plate having an elongated slot therein.

6. The device of claim 2 wherein said mounting means comprises a guide plate having an elongated slot therein.

7. The device of claim 1 wherein said member is slidably connected to said mounting means.

8. The device of claim 5 wherein said member comprises a shielding plate having means insertable into said slot for forming a slidable engagement between said shielding plate and said guide plate.

9. The device of claim 6 wherein said member comprises a shielding plate having means insertable into said slot for forming a slidable engagement between said shielding plate and said guide plate.

10. The device of claim 1 wherein said housing has a pair of opposing sides and said mounting means comprises two pairs of parallel rows of bosses each pair of which is situated on a different one of said sides in opposing relationship with the opposite pair, said rows being spaced apart a distance substantially equal to the width of said shielding member and effective to frictionally support the sides of said shielding member.

* * * * *